United States Patent
Bromer et al.

(10) Patent No.: US 12,458,038 B2
(45) Date of Patent: Nov. 4, 2025

(54) AIRFLOW REVERSAL SYSTEM FOR EFFICIENT THAWING PROCESSES

(71) Applicant: CFA Properties, Inc., Atlanta, GA (US)

(72) Inventors: Jonathan Bromer, Atlanta, GA (US); William Brandon Goodwin, Atlanta, GA (US)

(73) Assignee: CFA PROPERTIES, INC., Atlanta, GA (US)

( * ) Notice: Subject to any disclaimer, the term of this patent is extended or adjusted under 35 U.S.C. 154(b) by 0 days.

(21) Appl. No.: 18/969,930

(22) Filed: Dec. 5, 2024

(65) Prior Publication Data

US 2025/0185678 A1    Jun. 12, 2025

Related U.S. Application Data

(60) Provisional application No. 63/606,693, filed on Dec. 6, 2023.

(51) Int. Cl.
| | |
|---|---|
| *A23B 4/07* | (2006.01) |
| *F24C 15/00* | (2006.01) |
| *F24C 15/32* | (2006.01) |

(52) U.S. Cl.
CPC .............. *A23B 4/07* (2013.01); *F24C 15/006* (2013.01); *F24C 15/322* (2013.01)

(58) Field of Classification Search
CPC .... F24C 15/006; F24C 15/322; F24C 15/325; F24C 15/32; F24C 15/327; A21B 1/24;
(Continued)

(56) References Cited

U.S. PATENT DOCUMENTS

| | | |
|---|---|---|
| 3,976,122 A | 8/1976 | Neidhardt |
| 4,019,022 A | 4/1977 | Seider et al. |
| | (Continued) | |

FOREIGN PATENT DOCUMENTS

| | | |
|---|---|---|
| CN | 203913295 | 11/2014 |
| CN | 206423481 | 8/2017 |
| | (Continued) | |

OTHER PUBLICATIONS

Aladdin Temp-Rite, "Convect-Rite 3 © INSIGHT System Mini, Air Cooled", retrieved from the Internet at URL: <https://www.aladdintemprite.com/new-convect-rite-3-insightr-system-mini-air-cooled.html> on Mar. 17, 2025, 3 pages.

(Continued)

*Primary Examiner* — Reginald Alexander
(74) *Attorney, Agent, or Firm* — ALSTON & BIRD LLP

(57) ABSTRACT

Embodiments of the present disclosure relate to a food thawing apparatus. An example food thawing apparatus includes a thawing chamber configured to receive a plurality of frozen products; at least one refrigeration element configure to cool air within the thawing chamber; at least one heating element configured to heat air within the thawing chamber; a plurality of fans spaced vertically apart from one another and in alignment with a vertical axis, wherein: at least one fan is configured to generate an airflow of heated air within the thawing chamber, the airflow configured to thaw the frozen products; and at least one rotational element configured to rotate the at least one fan about the vertical axis between a first orientation and a second orientation to adjust the direction of the airflow within the thawing chamber, wherein the fan is configured to continue to generate the airflow as the frame is rotated.

14 Claims, 17 Drawing Sheets

(58) Field of Classification Search
CPC .... A21B 1/36; A23B 4/07; F27D 7/02; F27D 2007/045
USPC .......................................... 99/474, 475, 476
See application file for complete search history.

(56) References Cited

U.S. PATENT DOCUMENTS

| | | | |
|---|---|---|---|
| 4,189,995 | A | 2/1980 | Löhr et al. |
| 4,224,862 | A | 9/1980 | Liebermann |
| 4,727,801 | A | 3/1988 | Yokoi et al. |
| 5,086,693 | A | 2/1992 | Tippmann et al. |
| 5,404,935 | A | 4/1995 | Liebermann |
| 5,497,760 | A | 3/1996 | Alden et al. |
| 5,701,804 | A | 12/1997 | Liebermann |
| 7,025,121 | B2 | 4/2006 | Whitehead et al. |
| 7,119,306 | B2 | 10/2006 | Boryca et al. |
| 7,348,522 | B1 | 3/2008 | Criscuolo |
| 9,723,950 | B2 | 8/2017 | Tippman et al. |
| 9,895,022 | B2 | 2/2018 | Fracas et al. |
| 11,284,742 | B2 | 3/2022 | Grimaldi et al. |
| 11,684,076 | B2 | 6/2023 | Jackson et al. |
| 2004/0139863 | A1* | 7/2004 | Boryca ............... A23B 2/82 99/483 |
| 2004/0200362 | A1* | 10/2004 | Leppich ............... F24C 15/325 99/476 |
| 2012/0328753 | A1* | 12/2012 | Mondello ............. A23L 5/15 426/523 |
| 2022/0132892 | A1* | 5/2022 | Bieri ............... A23B 2/82 99/483 |
| 2023/0235895 | A1* | 7/2023 | Kalbande ............. F24C 15/16 126/21 A |
| 2023/0329288 | A1* | 10/2023 | Bench ............... A23B 2/82 |
| 2023/0332818 | A1 | 10/2023 | Ji et al. |
| 2024/0349942 | A1 | 10/2024 | Nguyen et al. |

FOREIGN PATENT DOCUMENTS

| | | | |
|---|---|---|---|
| CN | 108541868 | A | 9/2018 |
| CN | 212814041 | U | 3/2021 |
| CN | 217884965 | U | 11/2022 |
| EP | 2926675 | A1 | 10/2015 |
| EP | 4160125 | A1 | 4/2023 |
| JP | 3176722 | B2 | 2/1994 |
| JP | 2019097547 | A | 6/2019 |
| JP | 2020018281 | A | 2/2020 |
| JP | 2020080838 | A | 6/2020 |
| JP | 2020130010 | A | 8/2020 |
| JP | 2023003632 | A | 1/2023 |
| KR | 101894051 | B1 | 9/2018 |
| WO | WO 99/58036 | A2 | 11/1999 |
| WO | WO-2012171076 | A1 * | 12/2012 ............ A21B 1/26 |
| WO | WO 2022/012431 | A1 | 1/2022 |

OTHER PUBLICATIONS

Aladdin Temp-Rite, "Ready 2 Dyne (Refrigerated Automatic Rethermalizer)", Manual P/N 94464, Rev. K Jan. 2, 2007, retrieved from the Internet at URL: <https://tdyne.com/uploads/media/Product_Downloads/700-dp-userservice-manual.pdf> on Mar. 17, 2025, 29 pages.

Thermodyne, "Rapid Chill 700RC", retrieved from the Internet at URL: <https://tdyne.com/uploads/media/Thermodyne_SpecSheet_RapidChill_700RC.pdf> on Mar. 17, 2025, 2 pages.

WIPO Application No. PCT/US2024/058651, PCT International Search Report and Written Opinion of the International Searching Authority mailed Jun. 2, 2025.

* cited by examiner

AIRFLOW REVERSING ASSEMBLY

SINGLE-DOOR THAW CABINET
AIR PLENUM INTERIOR VIEW

AIRFLOW REVERSAL SYSTEM FOR EFFICIENT THAWING PROCESSES

CROSS REFERENCE TO RELATED APPLICATIONS

This application claims the benefit of and priority to U.S. Provisional Application No. 63/606,693, filed Dec. 6, 2023, entitled "AIRFLOW REVERSAL SYSTEM FOR EFFICIENT THAWING PROCESSES," the disclosure of which is incorporated herein by reference in its entirety.

TECHNICAL FIELD

This application generally relates to systems and processes for improving efficiency of thawing for frozen products, such as poultry.

BACKGROUND

In quick-service restaurants (QSR), distribution centers (DCs), and/or the like, food products are often obtained frozen and require timely thawing to ensure readiness for preparation. Thawing generally refers to reversing a freezing process by raising the temperature of a consumable to an adequate temperature such that the product may be properly cooked. This has historically been achieved by placing frozen consumables into a thawing chamber inside of which the air temperature is maintained at an appropriate thawing temperature. Typically, the thawing chamber includes a fixed internal fan that circulates air within the thawing chamber. However, such approaches may unequally thaw frozen products due to large deviations in thermal transfer that result from the thermal gradient caused by the unidirectional airflow. For example, due to changes in temperature as the airflow progresses throughout the thawing cabinet, frozen products closer to the outlet of the fan may experience faster thawing times as compared to frozen products disposed further from the outlet. Additionally, individual frozen products may experience internal deviations in thawing consistency due to different sides of the frozen product being permanently maintained facing toward or away from the airflow. Such approaches may result in increased overall thawing times and uneven thawing amongst batches of frozen products. Thus, QSRs and DCs have not yet solved the challenges of efficiently and evenly thawing frozen consumables.

BRIEF SUMMARY

Embodiments of the present disclosure relate to apparatuses, devices, systems, and methods for thawing frozen products. An example food thawing apparatus may include a thawing chamber configured to receive a plurality of frozen products; at least one refrigeration element configure to cool air within the thawing chamber; at least one heating element configured to heat air within the thawing chamber; a plurality of fans spaced vertically apart from one another and in alignment with a vertical axis, wherein: at least one fan is configured to generate an airflow of heated air within the thawing chamber, the airflow configured to thaw the plurality of frozen products; and at least one rotational element configured to rotate the at least one fan about the vertical axis between a first orientation and a second orientation to adjust the direction of the airflow within the thawing chamber, wherein the fan is configured to continue to generate the airflow as the frame is rotated.

In some embodiments, the food thawing apparatus further comprises a frame comprising the at least one heating element, the plurality of fans, and the at least one rotational element, wherein the at least one rotational element is configured to rotate the frame to adjust the direction of the airflow within the thawing chamber. In some embodiments, the at least one rotational element comprises a servomotor. In some embodiments, the food thawing apparatus further comprises a shaft extending along the vertical axis, wherein the plurality of fans are rotationally connected to the shaft; and the at least one rotational element further comprises a drive belt configured to rotationally connect the servomotor to the shaft.

In some embodiments, the food thawing apparatus further comprises a computing device configured to activate the at least one rotational element to adjust the direction of the airflow within the thawing chamber. In some embodiments, the computing device is configured to activate the at least one rotational element at a predetermined time interval. In some embodiments, the food thawing apparatus further comprises at least one thermal sensor configured to generate a thermal profile of the plurality frozen products, wherein the computing device is configured to: receive the thermal profile from the at least one thermal sensor; and activate the at least one rotational element based on the thermal profile. In some embodiments, the food thawing apparatus further comprises a first temperature sensor configured to measure temperature of a first portion of the thawing chamber; and a second temperature sensor configured to measure temperature of a second portion of the thawing chamber, wherein the computing device is configured to: receive a first temperature measurement from the first temperature sensor; receive a second temperature measurement from the second temperature sensor; generate a differential metric pursuant to the first portion and the second portion of the thawing chamber based at least in part on the first temperature measurement and the second temperature measurement; and activate the at least one rotational element based at least in part on the differential metric.

In some embodiments, the at least one heating element comprises a first heating element in a first portion of the thawing chamber and a second heating element in a second portion of the thawing chamber; the first heating element is configured to be proximate to a respective outlet of the plurality of fans in the first orientation; and the second heating element is configured to be proximate to the respective outlet of the plurality of fans in the second orientation. In some embodiments, the food thawing apparatus further comprises a plurality of shelves spaced vertically apart from one another and in alignment with a second vertical axis, wherein: a respective shelf configured to receive a subset of the plurality of frozen products; and the plurality of fans are vertically spaced in horizontal alignment with the plurality of shelves. In some embodiments, a first subset of the plurality of shelves comprise a solid surface configured to prevent movement of the airflow between adjacent shelves; and a second subset of the plurality of shelves comprise a porous surface configured to enable movement of the airflow between adjacent shelves.

Another example food thawing apparatus includes a cabinet structure defining a thawing chamber having a back side, a front side, a first lateral side and a second lateral side; and a plurality of fans arranged to create a plurality of looped air flow paths along respective heights of the thawing chamber, wherein the apparatus is configured to operate in a first mode in which the fans are operated to move air along the looped air flow paths in a first loop direction and a second mode in which the fans are operated to move air along the looped air flow paths in a second loop direction.

An example thawing method includes generating, via at least one fan within a chamber, a first airflow in a first direction, the first airflow configured to thaw a plurality of frozen products within the thawing chamber; rotating the at least one fan from a first orientation to a second orientation via a respective rotational element; and generating, via the at least one fan, a second airflow in a second direction, the second airflow configured to persist the thaw of the plurality of frozen products.

In some embodiments, the method further comprises heating air within the thawing chamber via at least one heating element. In some embodiments, the method further comprises cooling the air within the thawing chamber via at least one refrigeration element. In some embodiments, the method further comprises rotating the at least one fan in accordance with a predetermined time interval. In some embodiments, the method further comprises rotating the at least one fan from the second orientation to the first orientation via the respective rotational element; and generating, via the at least one fan, an additional airflow in the first direction. In some embodiments, the method further comprises activating the at least one rotational element based at least in part on a thermal profile of the plurality of frozen products. In some embodiments, the method further comprises generating a differential metric based at least in part on a first temperature measurement associated with a first portion of the thawing chamber and a second temperature measurement associated with a second portion of the thawing chamber; and activating the at least one rotational element based at least in part on the differential metric.

BRIEF DESCRIPTION OF THE FIGURES

Figure 1:
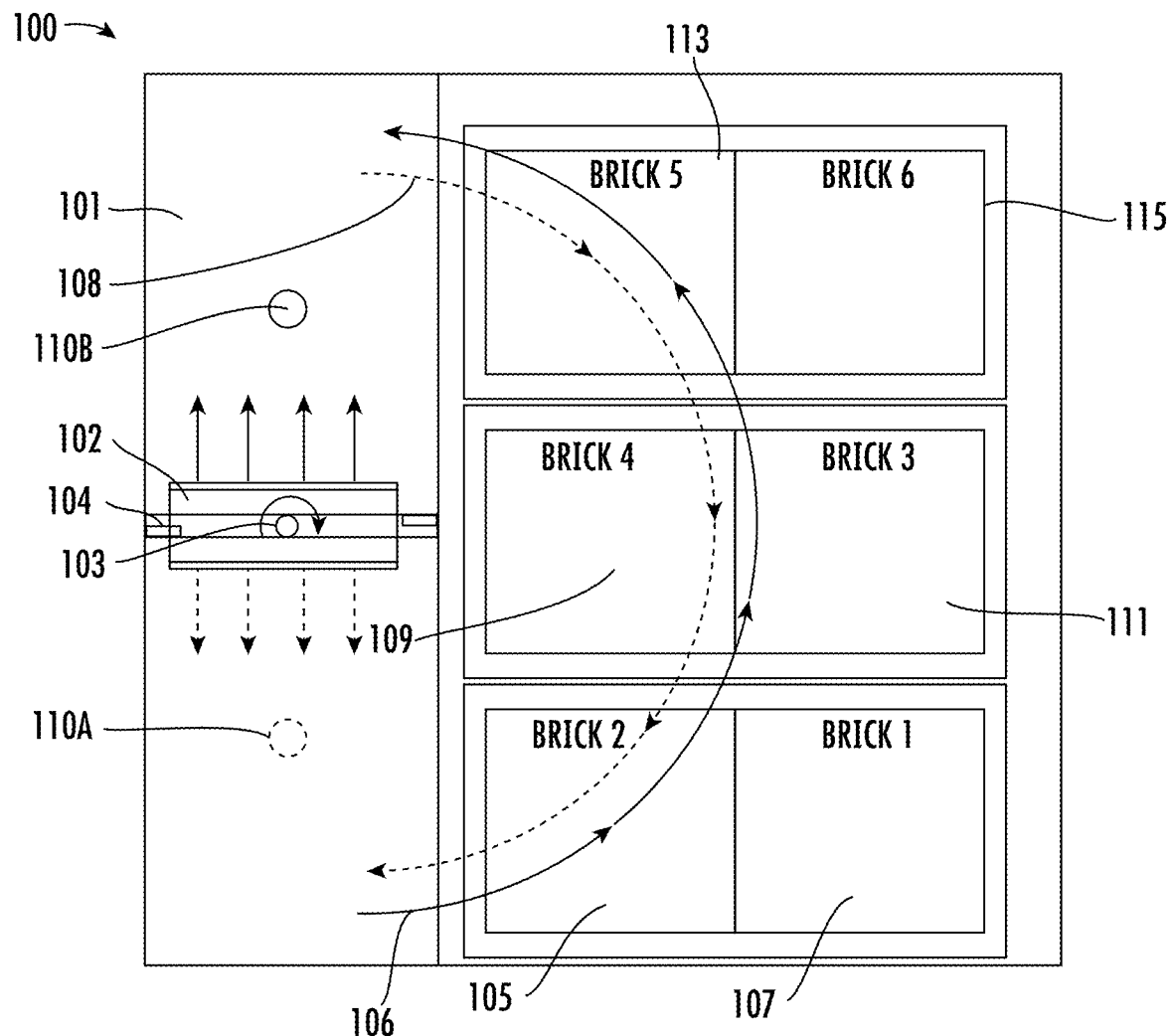
Figure 2:
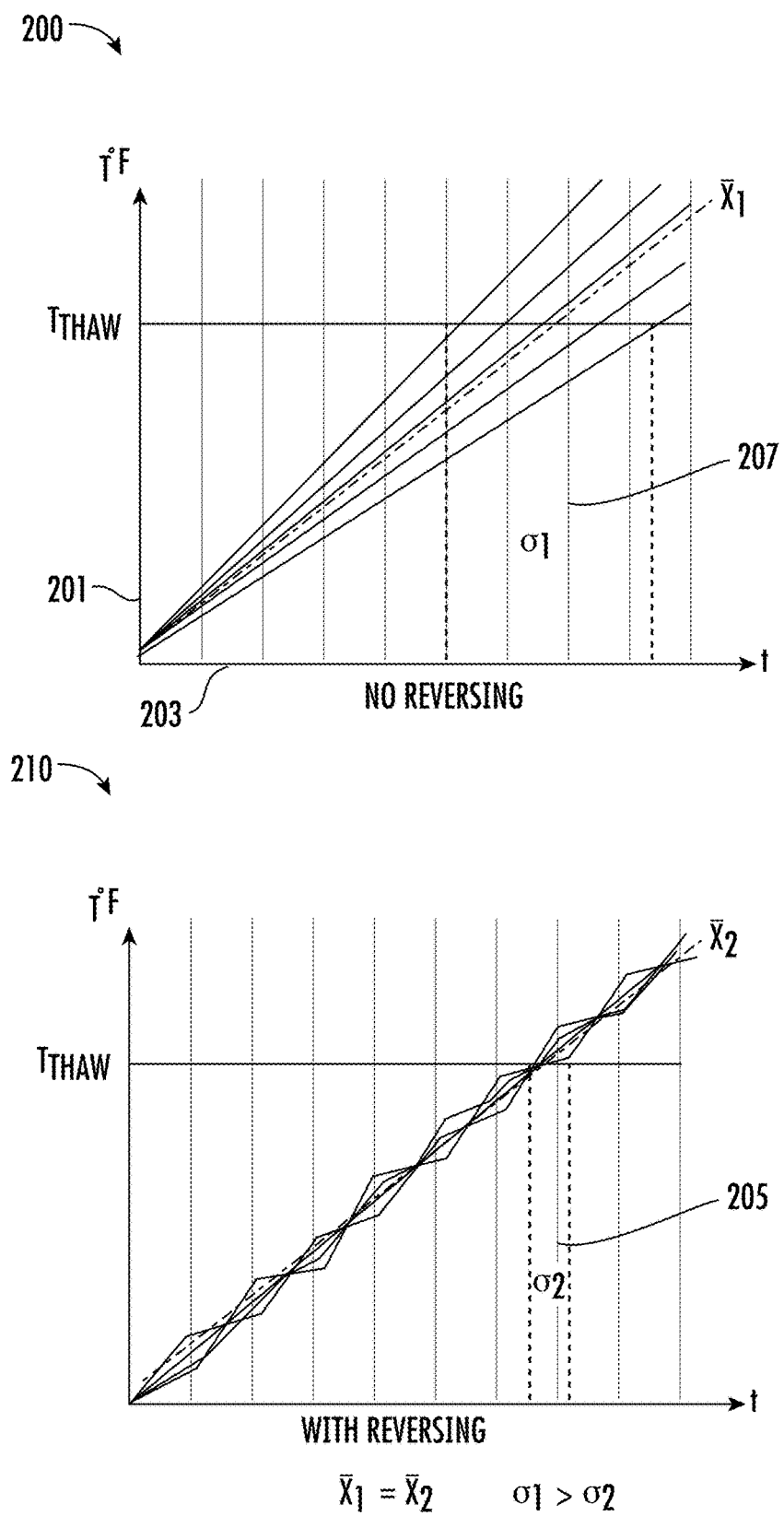
Figure 3:
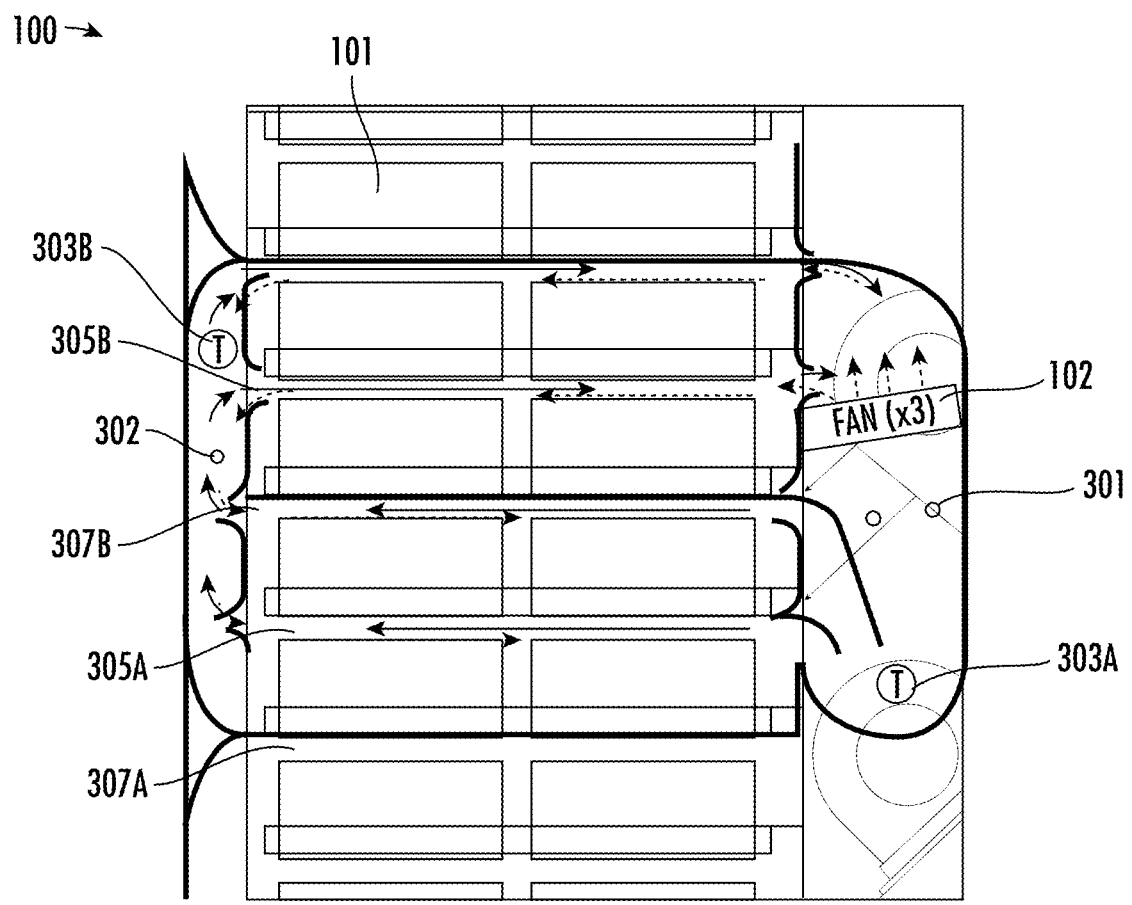
Figure 4:
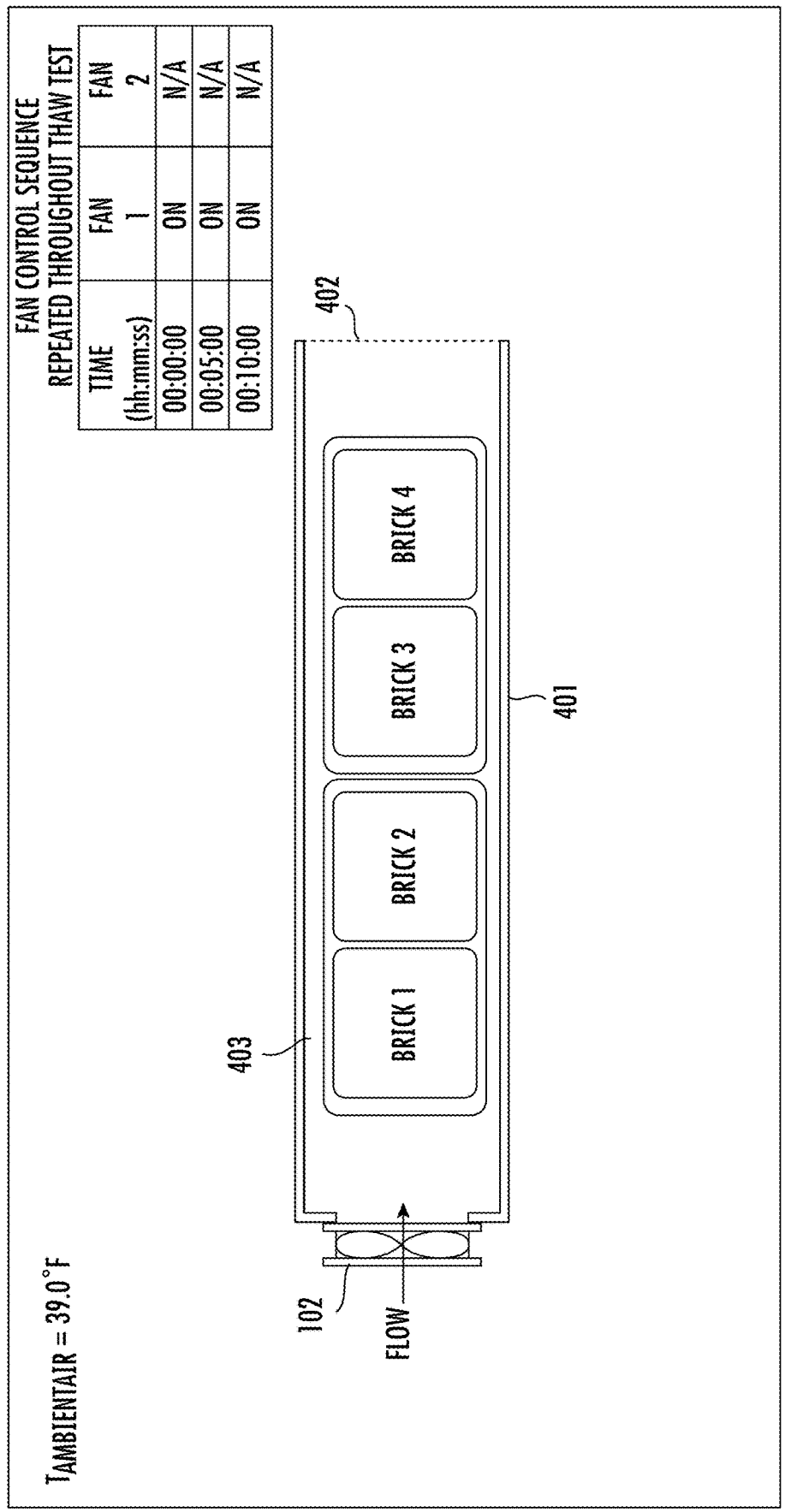
Figure 5:
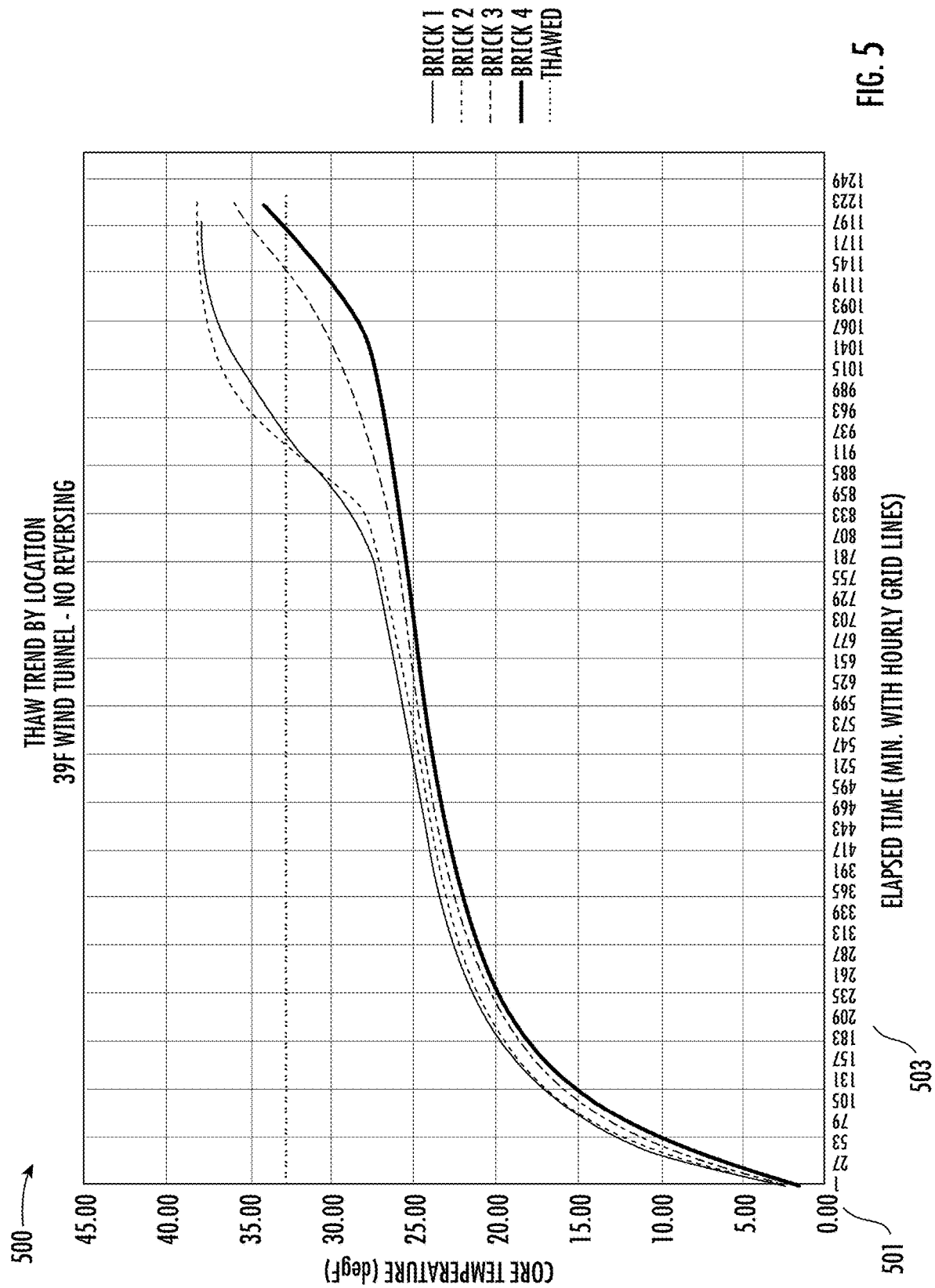
Figure 6:
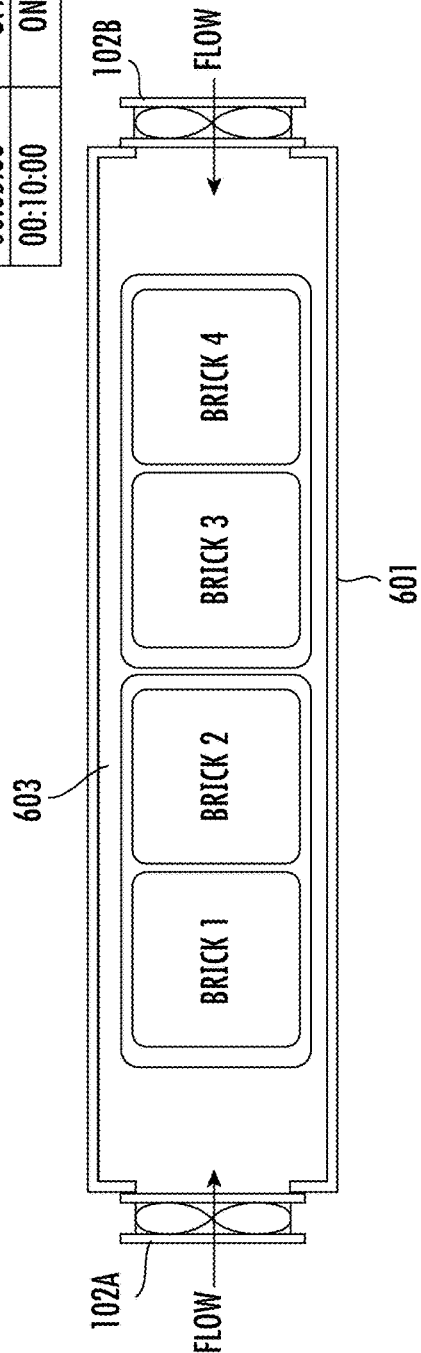
Figure 7:
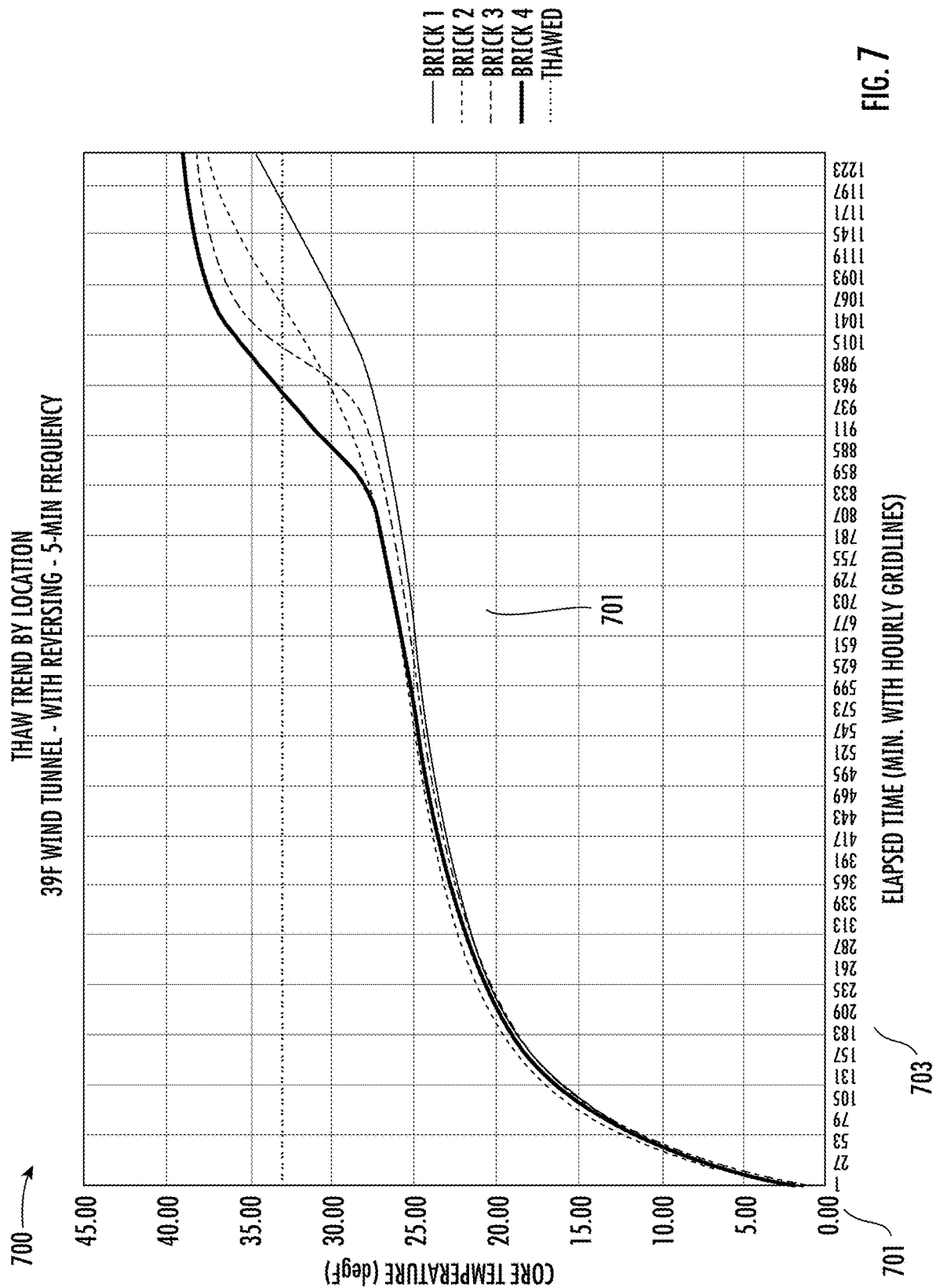
Figure 8:
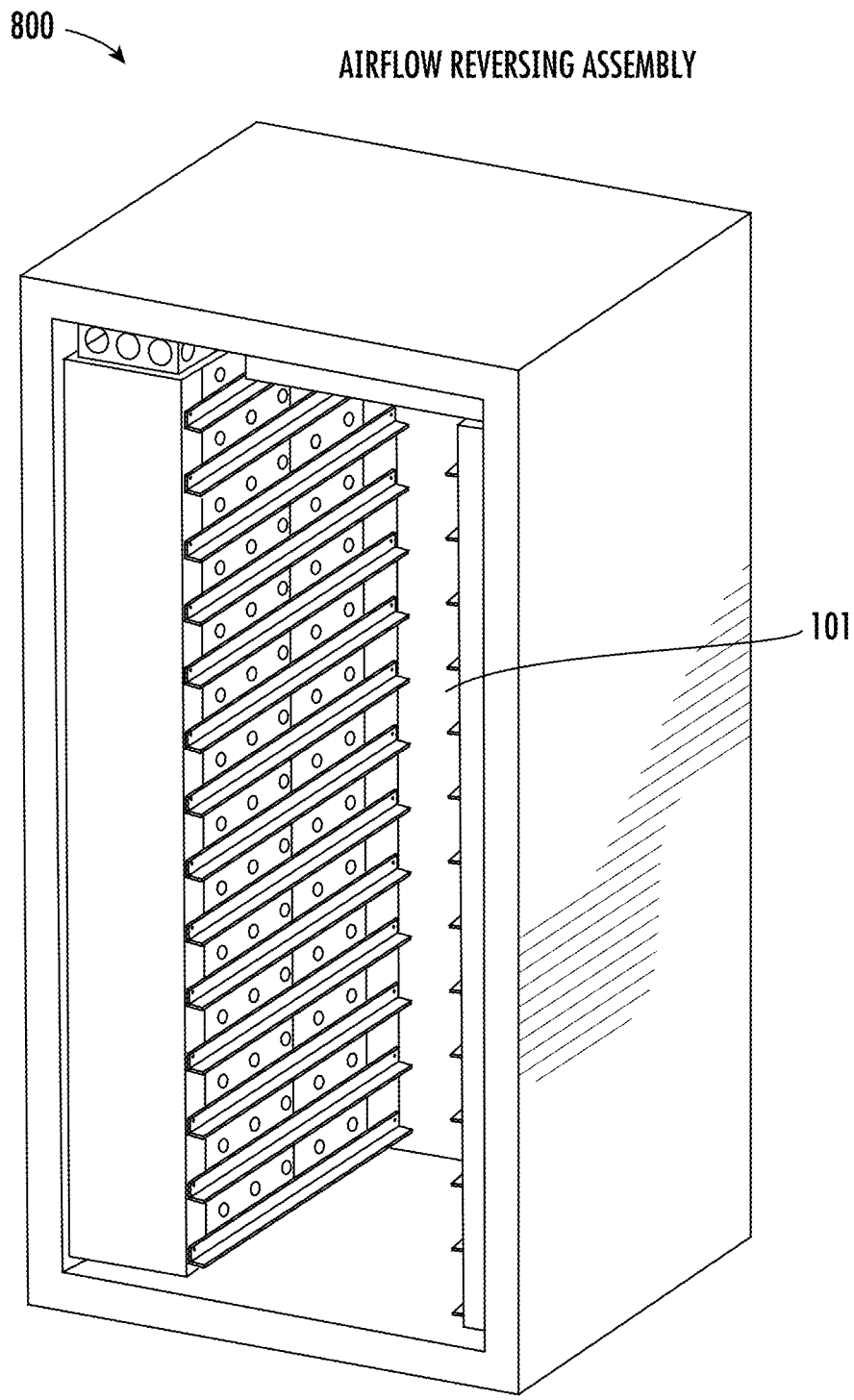
Figure 9:
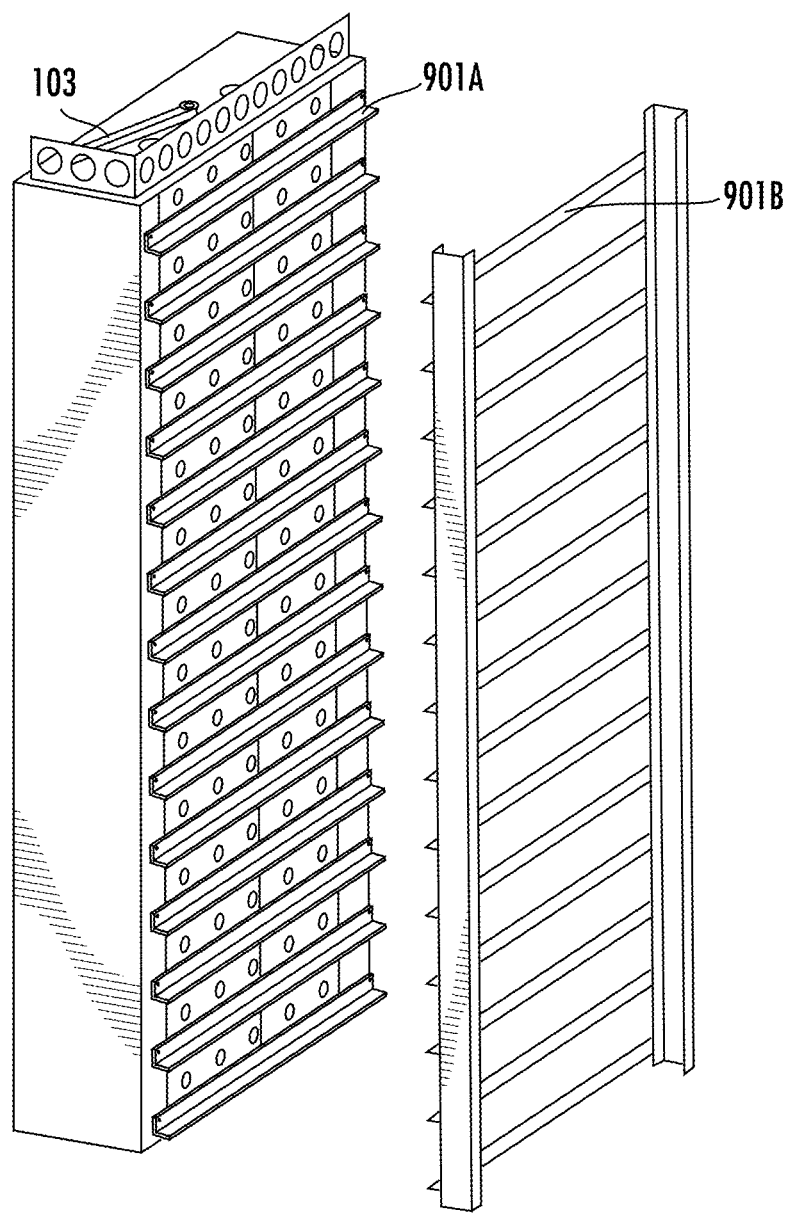
Figure 10:
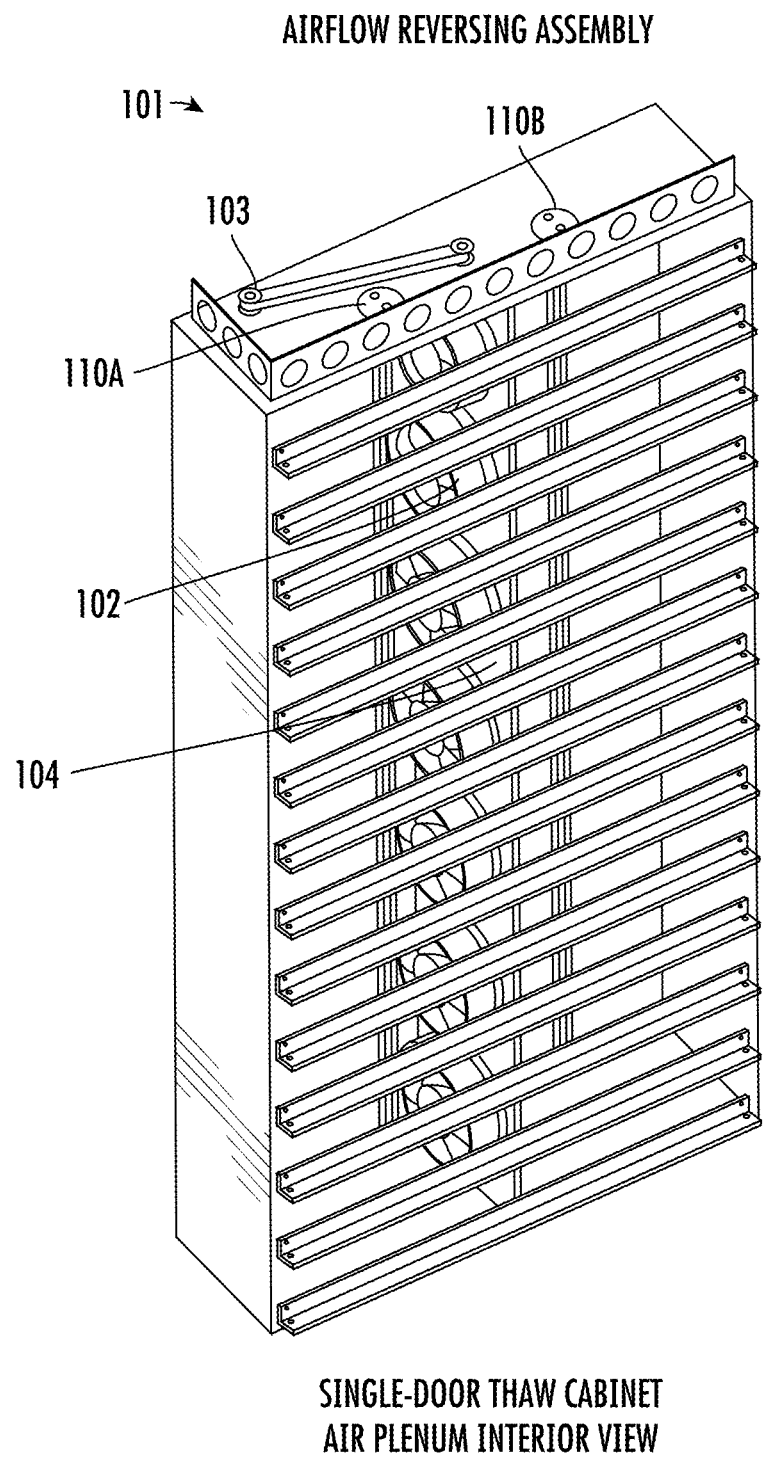
Figure 11:
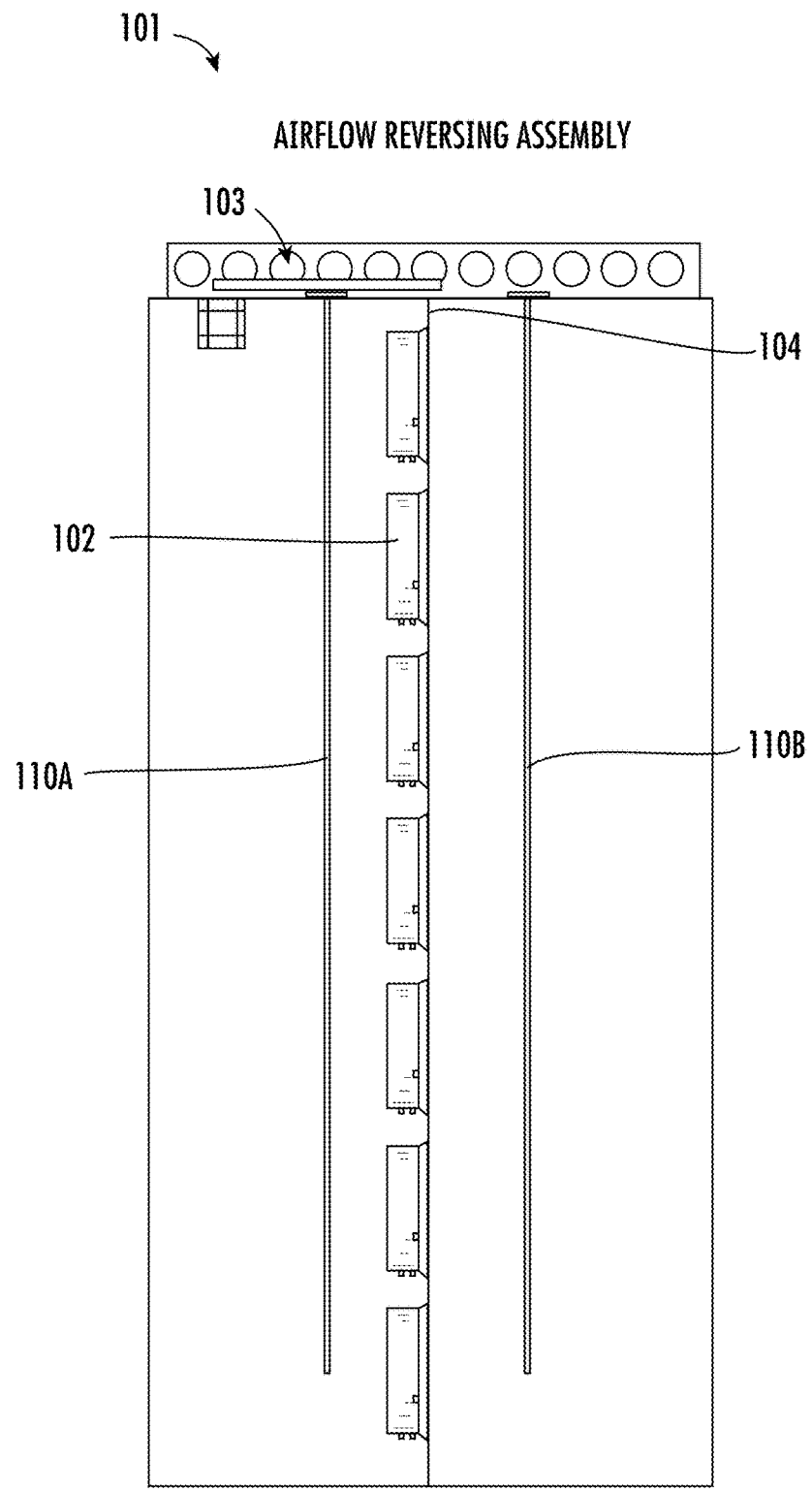
Figure 12:
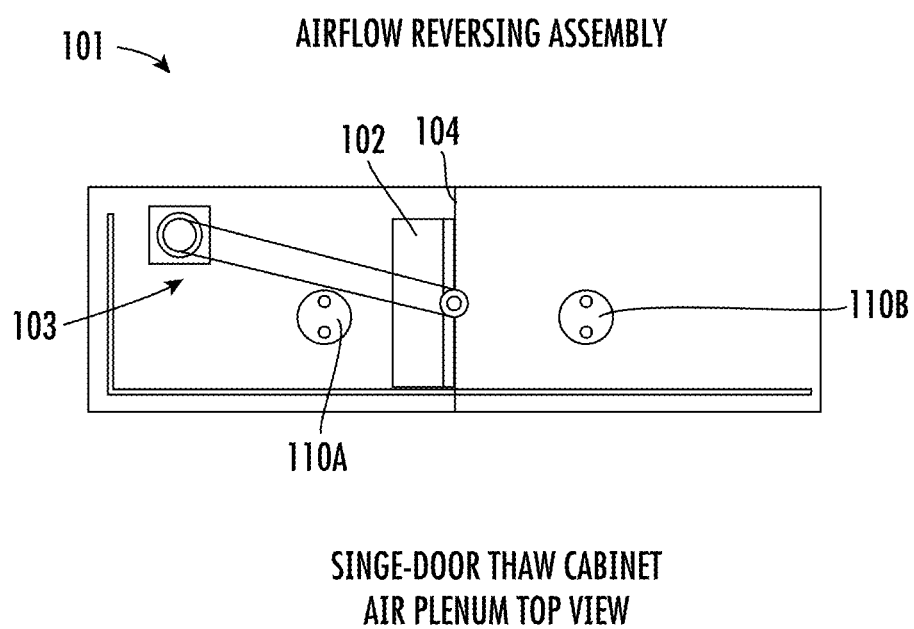
Figure 13:
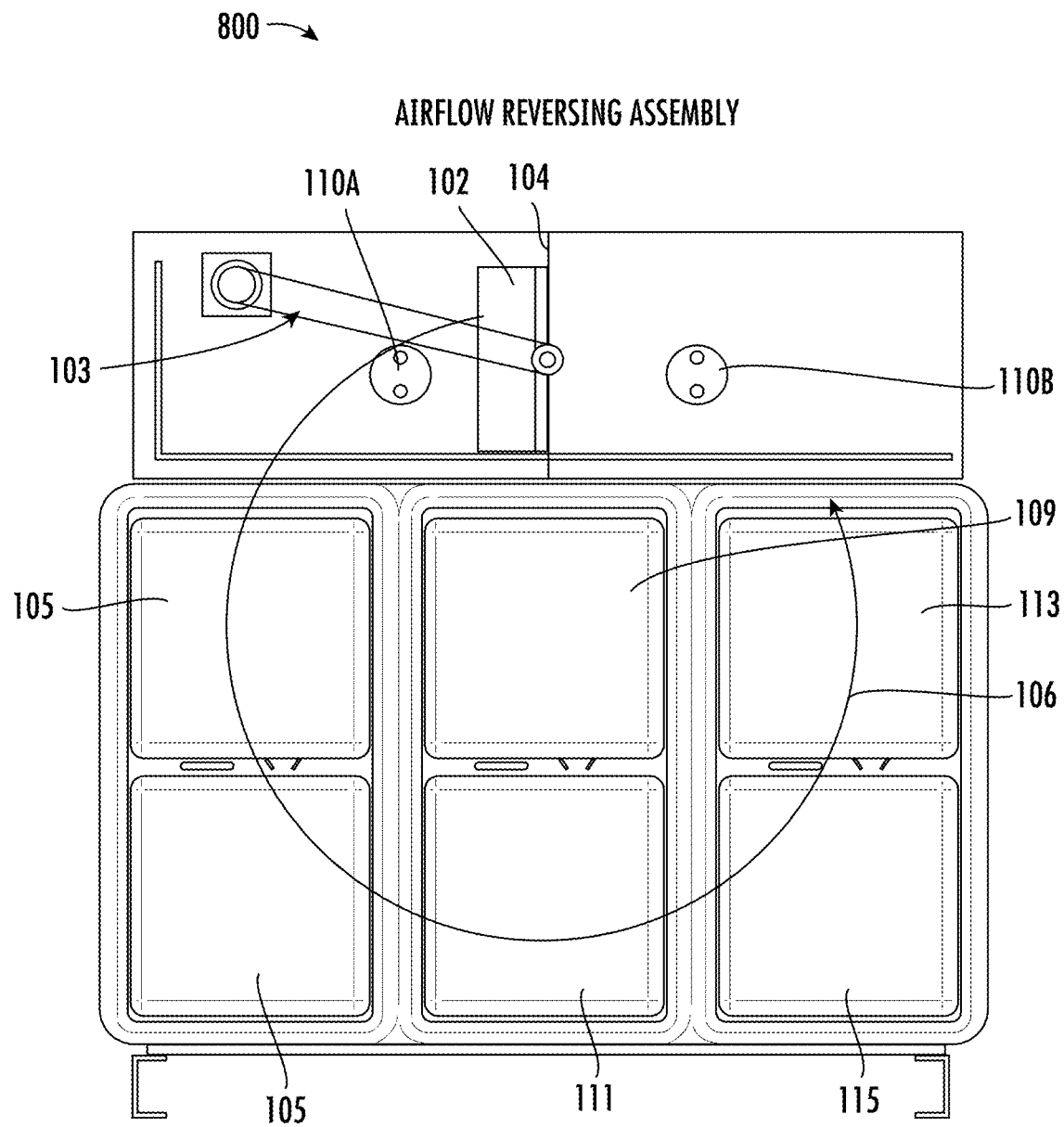
Figure 14:
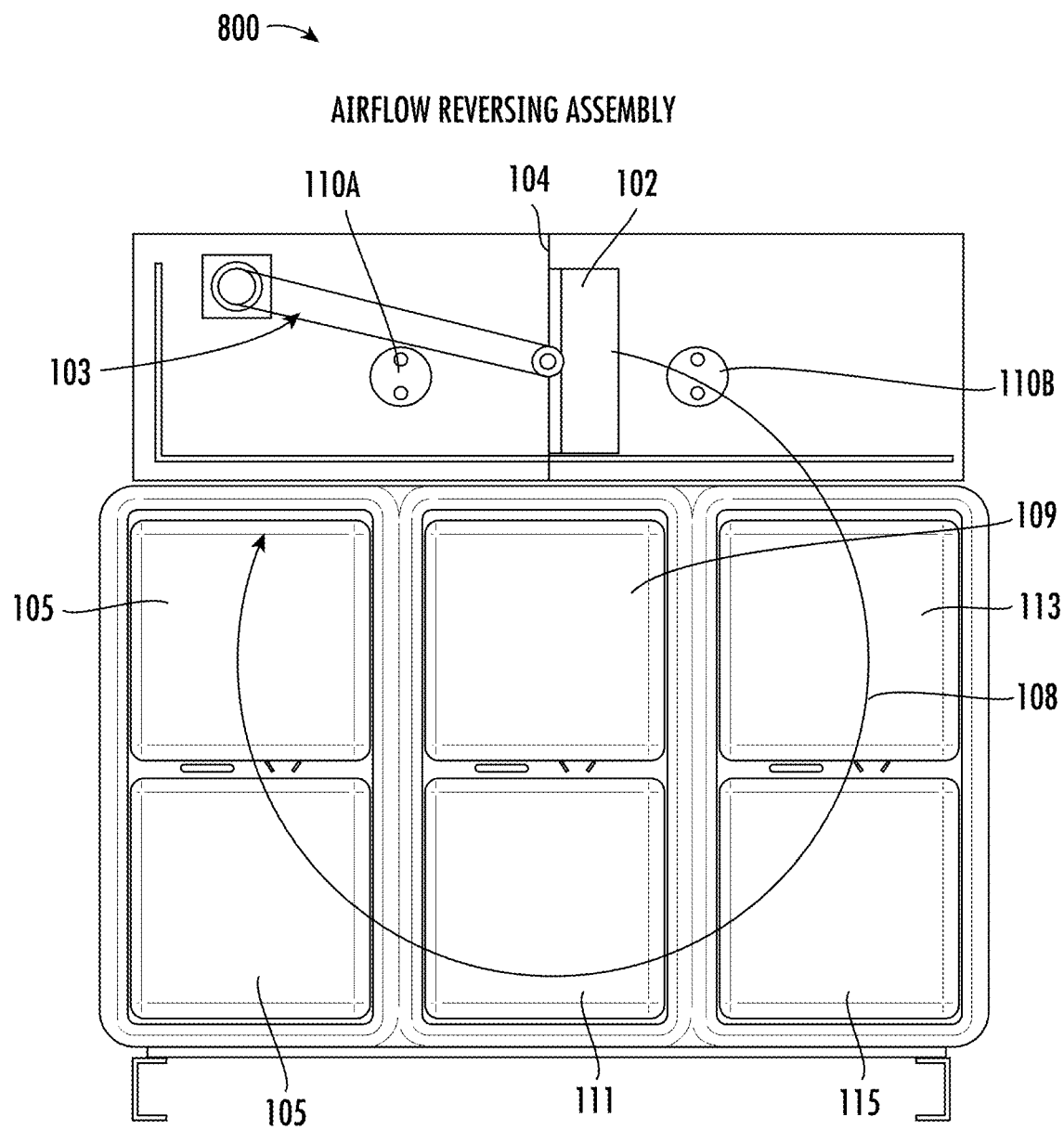
Figure 15:
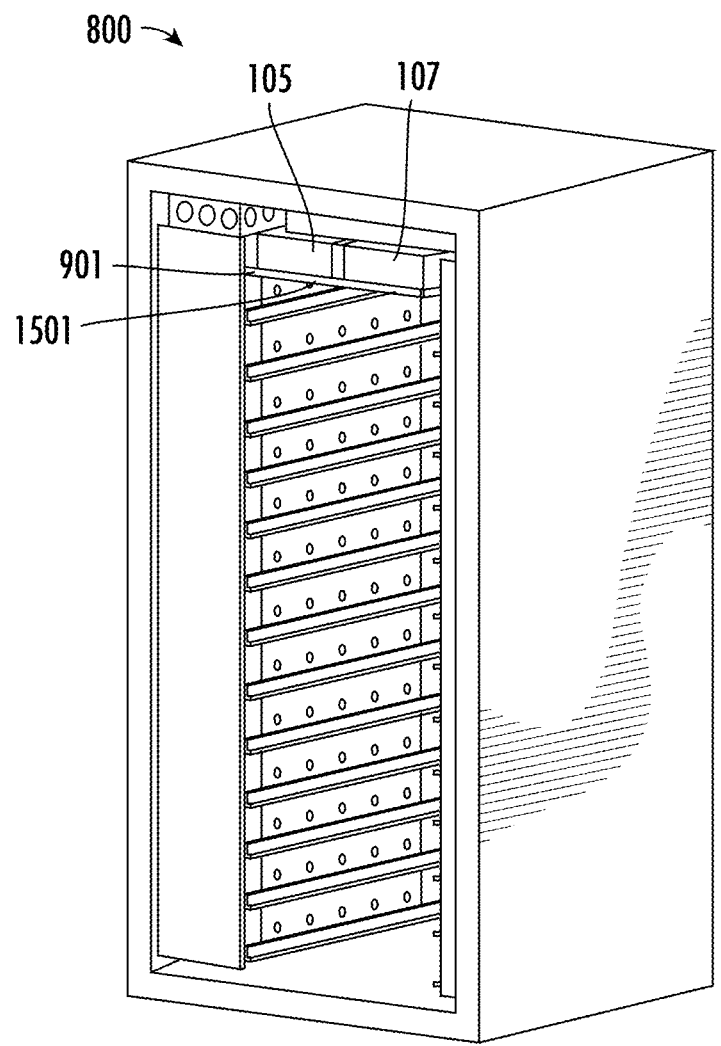
Figure 16:
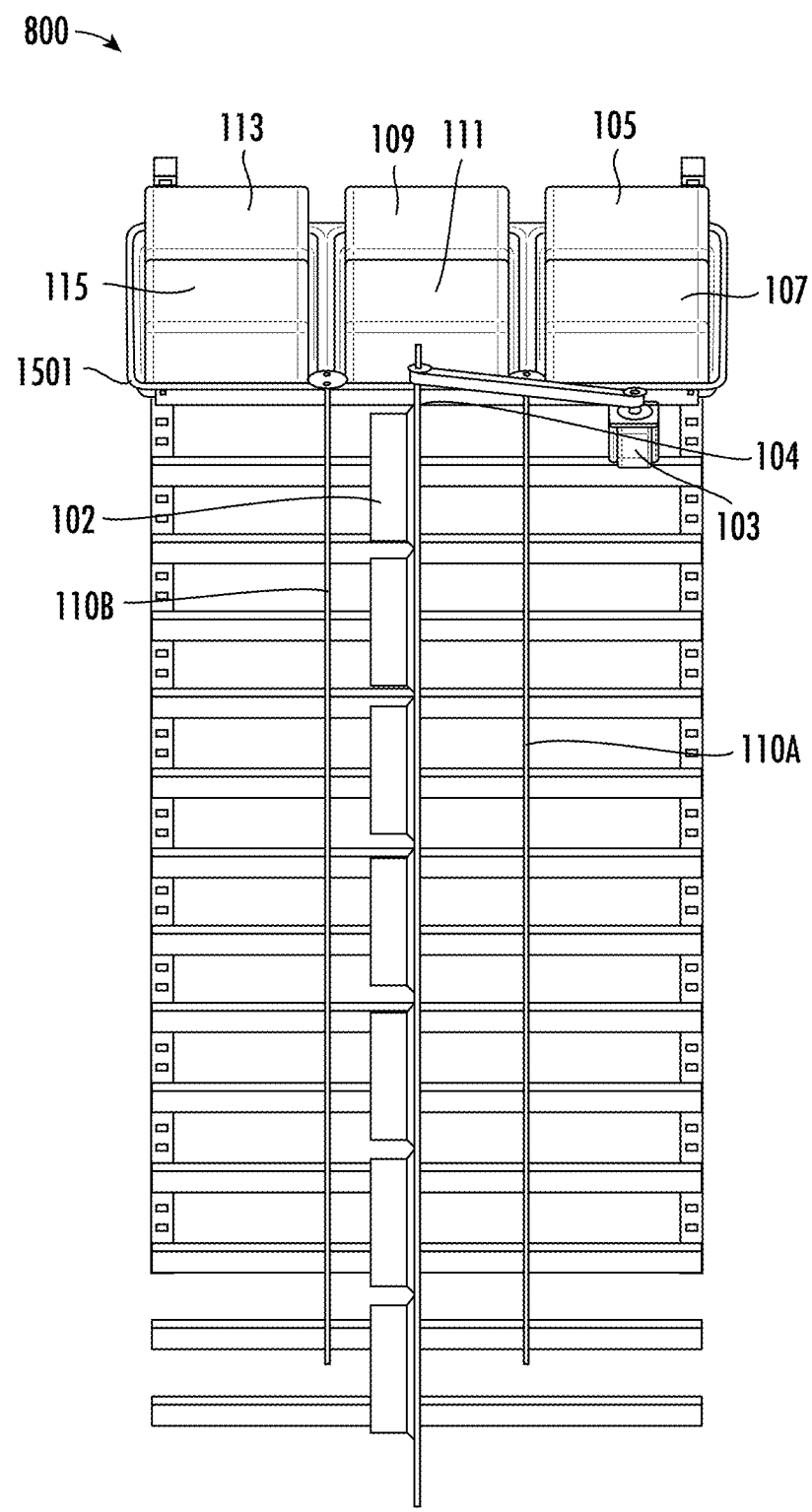
Figure 17:
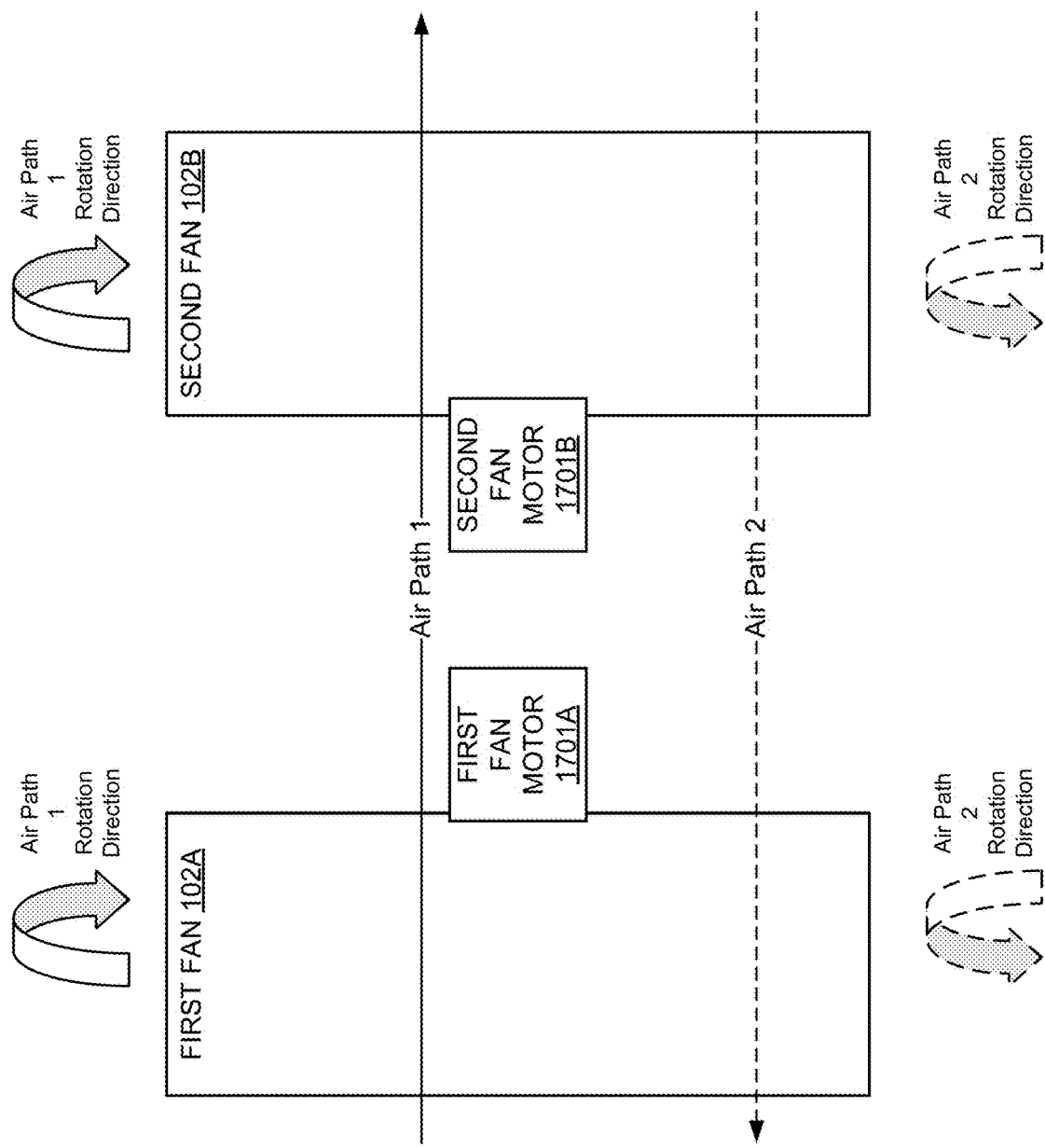

Having thus described the embodiments of the disclosure in general terms, reference now will be made to the accompanying drawings, which are not necessarily drawn to scale, and wherein:

FIG. 1 shows an example airflow reversal system for airflow in a horizontal plane in accordance with some embodiments of the present disclosure;

FIG. 2 shows charts of respective thawing performance in existing thawing techniques lacking airflow reversal and in airflow-reversal techniques provided in accordance with some embodiments of the present disclosure;

FIG. 3 shows an example airflow reversal system for airflow in a vertical plane in accordance with some embodiments of the present disclosure;

FIG. 4 shows an example test arrangement for a non-reversing airflow system in accordance with typical approaches;

FIG. 5 shows a chart of thawing performance observed in the non-reversing airflow system;

FIG. 6 shows an example test arrangement for an airflow reversal system in accordance with some embodiments of the present disclosure;

FIG. 7 shows a chart of thawing performance observed in an airflow reversal system in accordance with some embodiments of the present disclosure;

FIG. 8 shows a perspective view of an example airflow reversal system in accordance with some embodiments of the present disclosure;

FIG. 9 shows an exploded view of a portion of an example airflow reversal system in accordance with some embodiments of the present disclosure;

FIG. 10 shows a perspective view of an example thawing chamber of an airflow reversal system in accordance with some embodiments of the present disclosure;

FIG. 11 shows a side view of an example thawing chamber of an example airflow reversal system in accordance with some embodiments of the present disclosure;

FIG. 12 shows a top view of an example thawing chamber of an example airflow reversal system in accordance with some embodiments of the present disclosure;

FIG. 13 shows a top view an example airflow reversal system configured to generate air flow along a first air path in accordance with some embodiments of the present disclosure;

FIG. 14 shows a top view the example airflow reversal system configured to generate airflow along a second, opposing air path in accordance with some embodiments of the present disclosure;

FIG. 15 shows a front perspective view of an example airflow reversal system in accordance with some embodiments of the present disclosure;

FIG. 16 shows a top perspective view of a portion of an example airflow reversal system in accordance with some embodiments of the disclosure; and FIG. 17 shows a side view of an example airflow reversal system including a first fan 102A connected to a first fan motor 1701A and a second fan 102B connected to a second fan motor 1701B in accordance with some embodiments of the disclosure.

DESCRIPTION

In general, various embodiments of the present disclosure provide improved systems for thawing frozen food products. For purposes of describing and illustrating exemplary aspects of the thawing system, the proceeding description is presented in the context of thawing poultry products. It will be understood and appreciated that such context is provided by way of example and uses of the system in additional contexts, such as with other frozen products, are contemplated and within the scope of the invention.

In QSRs, distribution centers (DCs), and/or the like, frozen poultry products may be provided in the form of frozen bricks wrapped in a plastic overwrap. For example, individual chicken cutlets may be provided as frozen bricks sealed within a plastic overwrap. Historical approaches to thawing the bricks typically include placing the bricks into a thawing cabinet inside of which air is maintained at a thawing temperature. As previously described, typical thawing cabinets include a fan that is affixed to the interior of the cabinet and configured to circulate airflow within the cabinet. For example, existing approaches may circulate air exclusively in a clockwise direction or exclusively in a counterclockwise direction. However, the unidirectional airflow within the thawing cabinet may result in uneven thawing and increased thawing times due to the frozen products experiencing different rates of thermal transfer based on their respective positions along the path of the airflow. For example, products in a series of products that are furthest from the fan outlet may thaw more slowly than those products located more proximate to the fan outlet. The phenomena may result from the air being cooled as it passes over upstream products, which reduces the thermal gradient for each successive brick with respect to its distance from the fan outlet (e.g., air that is proximate to the fan outlet is warmest due to it having been heated by the chamber heating elements and not having yet come into contact with frozen products).

In various embodiments, the present disclosure provides an improved thawing system that increases thawing efficiency and consistency at least in part by adjusting the direction of airflow within a thawing chamber. For example, the thawing system enables reversal of airflow direction within the thawing chamber such that the standard deviation of thawing times amongst products is reduced as compared to thawing times observed in unidirectional airflow approaches. In some embodiments, the improved thawing system is referred to herein as an "airflow reversal system."

In some embodiments, the airflow reversal system periodically adjusts the direction of airflow within the thawing cabinet, chamber, and/or the like. For example, the airflow reversal system may reverse the direction of airflow from clockwise to counterclockwise on a set time interval. In some embodiments, by reversing the airflow, product thawing occurs more evenly across the frozen products on a given shelf of the thawing cabinet. For example, the reversal of the airflow path may reduce the differential of air-to-product thermal transfer between frozen products that are proximate to a warmer air outlet (e.g., a fan outlet side) and frozen products that are proximate to a cooler air inlet (e.g., a fan inlet side). In various embodiments, reducing the differential enables a corresponding reduction in standard deviation of thawing times while maintaining the current average thaw times for the product in the cabinet. In some embodiments, a reduction in standard deviation will result in a decreased thaw time at 95% confidence.

In some embodiments, the airflow reversal system includes one or more fans that direct airflow within the thawing chamber. In some embodiments, the airflow reversal system includes a frame into which one or more fans are integrated. In some embodiments, the frame includes one or more mechanisms for rotating the frame, thereby causing a corresponding rotation of the integrated fan and, resultingly, a change in the direction of airflow from the fan. For example, the frame includes a servo motor that periodically rotates the frame and fan to reverse the direction of airflow within the thawing chamber from clockwise to counterclockwise. In doing so, the airflow reversal system more evenly distributes heated air over the products within the thawing chamber, thereby exposing the products to the same average thermal gradient in either airflow direction. In various embodiments, by reducing the standard deviation in thermal gradient experienced by each product, the thermal airflow reversal system overcomes drawbacks of existing approaches in which unidirectional airflow results in large deviations in thermal transfer and, therefore, thawing time between products located at different distances from the source of airflow within the thawing chamber.

In some embodiments, the airflow reversal system embodies a walk-in cooler, walk-in freezer, large temperature processing unit, and/or the like. Typical approaches to such equipment utilize unidirectional airflows, which present similar drawbacks to typical thawing cabinets including large deviations in thaw times amongst products based on product position within the thawing chamber. Due in part to the increased length of air paths in walk-in coolers, freezers, and/or the like, the deviation in thermal gradient experienced by products positioned along the air path may be further exacerbated. In various embodiments, the airflow reversal system overcomes the challenges of such approaches by providing airflow in multiple directions such that the products are exposed to an average thermal gradient, which may result in reduced deviations in product thawing times.

Example Airflow Reversal System

FIG. 1. shows an example airflow reversal system 100 for airflow in a horizontal plane. In various embodiments, the airflow reversal system 100 is configured to efficiently thaw a plurality of frozen products 105, 107, 109, 111, 113, 115 by directing heated air over the frozen products and periodically reversing the direction of the heated air to reduce deviations in thermal transfer experienced by the frozen products. In some embodiments, the airflow reversal system 100 embodies a thawing cabinet, and/or the like, into which frozen products are disposed and subjected to thermal transfer processes for inducing thawing. In some embodiments, the airflow reversal system 100 includes a thawing chamber 101 that receives frozen products 105, 107, 109, 111, 113, 115. In some embodiments, the thawing chamber 101 includes one or more shelves onto which frozen products are disposed.

In various embodiments, the thawing chamber 101 includes or is operatively connected to one or more heating elements configured to heat air within the thawing chamber 101. Alternatively, or additionally, the heating element may be external to the thawing chamber 101, and air that is heated by the heating element may be pumped into the thawing chamber 101. In some embodiments, the thawing chamber 101 includes a first heating element 110A and a second heating element 110B that are each selectively activated based upon the orientation of the fan 102. For example, when the fan 102 is oriented to a first position associated with generating airflow along a first air path 106, the first heating element 110A may be activated (e.g., and the second heating element 110B deactivated). When the fan 102 is oriented to a second position associated with generating airflow along a second air path 108, the second heating element 110B may be activated (e.g., and the first heating element 110A deactivated). In various embodiments, the multiple, alternating sets of heat elements ensure that air is only heated at the outlet of the fan 102 in either orientation. In some embodiments, the thawing chamber 101 includes or is operatively connected to one or more refrigeration elements configured to cool air within the thawing chamber 101, which may moderate thawing processes such that air temperatures within the thawing chamber and/or of products disposed within are maintained within a narrow range.

In some embodiments, the thawing chamber 101 includes one or more fans 102 configured to intake, accelerate, and propel heated air throughout the thawing chamber 101. For example, the fan 102 may include a plurality of blades that rotate to draw in heated air from the heating element and generate an airflow to circulate the heated air over the frozen products 105, 107, 109, 111, 113, 115. In some embodiments, the fan 102 is oriented to generate airflow in a horizontal direction. For example, as shown in FIG. 1, the fan 102 may blow air clockwise or counterclockwise in a horizontal direction. Additionally, or alternatively, in some embodiments, the fan 102 is configured to generate airflow in a vertical direction. For example, as shown in FIG. 3, the fan 102 may blow air upwards or downwards in a vertical direction.

In some embodiments, the fan 102 includes or is operatively connected to a rotational element 103. In some embodiments, the rotational element 103 is configured to rotate the fan 102 and, thereby, adjust the direction of the airflow. For example, in a first position, the fan 102 may generate an airflow along a first air path 106. The rotational element 103 may rotate the fan 102 by 180 degrees to a second position such that the fan 102 generates an airflow along a second air path 108 that is opposite to the first air path 106. In some embodiments, the rotational element 103 embodies a servomotor, stepper motor, and/or the like. In some embodiments, the rotational element 103 embodies a linear actuator and gear system in which extension of the linear actuator engages the gear system to cause rotation of the fan 102.

In various embodiments, by reversing the direction of airflow from the first air path 106 to the second air path 108, the airflow reversal system 100 reduces a differential in the thermal transfer rates of frozen products 105, 107 (e.g., located closer to the outlet of the fan 102 in the first position) and frozen products 113, 115 (e.g., located further from the outlet in the first position). For example, the airflow reversal system 100 may ensure that the coldest frozen products in the first fan orientation (e.g., those located furthest along the air path 106 and/or away from the heating) are located closest along the air path 108 and/or to the heating element in the second fan orientation. Additionally, as the fan 102 rotates between fan orientations associated with opposing air paths 106, 108, the fan 102 continues to blow at various intermediate positions, thereby providing a dynamic airflow direction that impinges the frozen products, shelves, and other portions of the thawing chamber 101 at varying angles. The dynamic airflow angle throughout fan rotation may reduce or eliminate pockets of stagnant air that may occur when the fan 102 is fixed to the first orientation associated with air path 106 or the second orientation associated with air path 108. Further, by rotating the entire fan 102 the airflow reversal system 100 preserves the full performance rating of the fan 102 as opposed to running the fan blades backwards for sub-optimal air flow. In addition, the rotation of the entire fan 102 may enable the fan 102 to continue full-speed operation throughout adjustment of airflow direction and does not need to stop running in order to change directions.

In some embodiments, the thawing chamber 101 includes a frame 104. In some embodiments, the heating element, fan 102, and rotational element 103 are integrated into the frame 104. In some embodiments, the airflow reversal system 100 includes one or more gaskets that seal a perimeter of the frame 104 at its original and reversed rotational orientations to prevent air leakage around the frame 104. In some embodiments, the rotational element 103 is configured to rotate the frame 104 to cause a corresponding rotation of the integrated fan 102. For example, the rotational element 103 may rotate the frame 104 to reverse the direction of airflow provided by the fan 102 from the air path 106 to the air path 108. In some embodiments, the rotational element 103 is configured to activate and rotate at a predetermined time interval during the thawing process. The rotational element 103 may rotate the frame 104 and/or fan 102 once or multiple times during a thawing process. For example, upon completion of an initial time interval, the rotational element 103 may rotate the frame 104 from a first position associated with the air path 106 to a second position associated with a reversed air path 108. Upon completion of a second time interval, the rotational element 103 may return the frame 104 to the first position via reverse rotation or additional forward rotation.

Alternatively, or additionally, in some embodiments, the airflow reversal system includes a plurality of fans affixed to a frame 104. In some embodiments, each fan is part of a matched fan pair, and each fan of the pair is operatively connected to a separate fan motor. In some embodiments, the fan motor of the first fan of the pair is configured to spin the first fan in a first direction (e.g., an original equipment manufacturer (OEM)-configured direction) and the fan motor of the second fan is configured to spin the second fan in an opposite direction. In some embodiments, a spacer is disposed between the fans of each pair to provide a separation distance between their respective inlets. In various embodiments, the direction of airflow is then changed by commanding the motors to reverse rotation simultaneously for each matched pair of fans, which accomplishes airflow reversing without physically moving the frame into which the fans are mounted.

In some embodiments, while not shown in FIG. 1, the airflow reversal system 100 includes a computing device configured to control activation of the rotational element 103. For example, the computing device may automatically activate the rotational element 103 to rotate the fan 102 in response to determining a predetermined time interval has elapsed. In some embodiments, the airflow reversal system 100 includes one or more sensors that measure a temperature or thermal profile of the thawing chamber 101 and/or products disposed within. For example, the sensor may measure an approximate surface temperature, core temperature, and/or the like of each frozen product 105, 107, 109, 111, 113, 115. As another example, a first sensor may measure temperature within a first side of the thawing chamber 101 and a second sensor may measure temperature within an opposing side of the thawing chamber 101, where the opposing sides may correspond to regions proximate to the outlet and inlet of the fan 102, respectively. In some embodiments, the computing device receives the thermal profile measurements from the sensor. In some embodiments, based on processing the thermal profile measurements, the computing device activates the rotational element 103 to adjust the airflow direction to minimize the standard deviation of thawing amongst the frozen products. For example, based on the thermal profile measurements, the computing device may generate a differential metric indicative of a delta in thawing rates between the frozen products. In response to determining the differential metric exceeds a predetermined threshold, the computing device may activate the rotational element 103 to rotate the fan 102 and, thereby, adjust the direction of airflow in the thawing chamber 101 to reduce the delta of thawing rates amongst the products.

Alternatively, or additionally, in some embodiments, the fan 102 is external to the thawing chamber 101 and includes one or more ducting baffles that may be configured between an undeployed orientation and a deployed orientation to reverse the direction of airflow from the outlet of the fan 102 into and throughout the thawing chamber 101. For example, the ducting baffle may embody one or more panels that translate over the outlet of the fan 102 in a deployed orientation such that the forward direction of airflow from the outlet is immediately reversed via the air contacting and rebounding from the panel. The panel may include ducting that receives the airflow in a first direction and outputs the airflow in an opposing direction. Alternatively, or additionally, in some embodiments, the airflow reversal system 100 includes a first fan 102 located on a first side of the thawing chamber 101 and a second fan 102 located on an opposing side of the thawing chamber 101 (or located on the first side, where outlets of the first and second fans 102 are oriented in opposing directions). In some embodiments, the airflow reversal system 100 may alternate between activating the first fan 102 and the second fan 102 to control and reverse the direction of airflow within the thawing chamber 101. In some embodiments, the airflow reversal system 100 activates the first fan 102 in a first rotation direction and the second fan 102 in a second rotation direction that is opposite the first rotation direction, which may reduce the losses that would potentially occur by pushing the airflow through an idle fan.

FIG. 2 shows charts of respective thawing performance in existing thawing techniques lacking airflow reversal (chart 200) and in airflow-reversal techniques provided in accordance with some embodiments of the present disclosure (chart 210). Specifically, charts 200, 210 show relationships between product temperature (T) 201 as a function of time (t) 203. A target thawing temperature $T_{thaw}$ is indicated in each chart 200, 210. The chart 200 indicates a standard deviation 205 of respective thawing times for a plurality of products thawed in a non-reversing airflow system. The chart 210 indicates a standard deviation 207 of respective thawing times for a plurality of products thawed in an embodiment of the present airflow reversal system. The thawing time is indicated by the amount of time 203 required for the temperature 201 to reach $T_{thaw}$. In some embodiments, each thawing process is performed with air temperatures less than 40 degrees Fahrenheit.

As shown, the standard deviation 205 of thawing times in a non-reversing airflow system is significantly greater than the standard deviation 207 of thawing times in an embodiment of the present airflow reversal system. In other words, the standard deviation 205 may indicate that thawing processes of non-reversing airflow systems result in more uneven thawing as compared to airflow reversal systems. The differential in product thawing rates amongst products may result in some products being subjected to heated air in excess of that which is required to adequately thaw the product. In other words, because products located further from a fan outlet may require lengthier thaw times to reach $T_{thaw}$, the products located closer to the fan outlet may experience excess heat during the additional time interval required to adequately thaw the further distanced products. Additionally, the increased thaw time of a subset of the products may reduce overall efficiency and throughput of thawing processes. As evidenced by the standard deviation 207, an airflow reversal system may overcome the deficiencies of non-airflow reversing approaches by adjusting air path directions to reduce the differential in thaw rates amongst the products. The reduced deviation of product thawing times achieved by the airflow reversal system may provide comparative improvements in product preparation efficiency and throughput.

FIG. 3 shows an example airflow reversal system 100 for airflow in a vertical plane in accordance with some embodiments of the present disclosure. FIG. 3 illustrates example forward and reversed airpaths through the thawing chamber 101 using solid arrows and dashed arrows, respectively. As described herein, the airflow reversal system 100 includes one or more heating elements 301 configured to raise the temperature of air within the thawing chamber 101. In some embodiments, the airflow reversal system 100 includes one or more sensors configured to measure temperatures, thermal profiles, and/or the like within a section of the thawing chamber 101. For example, the airflow reversal system 100 may include a temperature sensor 303A located adjacent to an outlet of the fan 102 and a temperature sensor 303B located at a distance from the outlet such that readings of the temperature sensors 303A, 303B may be used to approximate a differential in air temperature within the thawing chamber 101.

In some embodiments, the airflow reversal system 100 includes a plurality of shelves upon which frozen products may be placed during thawing processes. In some embodiments, the airflow reversal system 100 includes multiple fans 102 that direct airflow onto individual shelves or groups of shelves. In some embodiments, the thawing chamber 101 includes a plurality of porous shelves 305A, 305B and a plurality of solid shelves 307A, 307B, where a solid shelf may be arranged between a pair of porous shelves. In some embodiments, the solid shelves 307A, 307B confine airflow from the fan 102 within a defined set of frozen products and/or trays containing frozen products, which may improve efficiency of thermal transfer between the heated air and the products by insulating the heated air. In some embodiments, each shelf 305A, 305B, 307A, 307B includes ducting to channel airflows along top and bottom surfaces of the frozen products and/or trays disposed along the shelf.

FIG. 4 shows an example test arrangement 400 for a non-reversing airflow system in accordance with typical approaches. The test arrangement 400 for non-reversing airflow includes a single fan 102 configured to generate and propel an airflow along a wind tunnel 401 having an open-ended outlet 402. A plurality of frozen products 403 ("bricks") are disposed sequentially within the wind tunnel. In various embodiments, due to the singular direction of the airflow from the fan 102, the frozen products 403 experience a thermal gradient as the airflow extends further from the fan outlet. For example, the frozen product closes to the fan 102 may experience the warmest air and the frozen product closest to the outlet 402 may experience the coolest air, which may result in deviations in thaw times as demonstrated in chart 500 of FIG. 5.

FIG. 5 shows a chart 500 of thawing performance observed in the non-reversing airflow system. The chart 500 shows core temperature 501 of the frozen products 403 in the non-reversing airflow arrangement 400 (FIG. 4) as a function of time 503. As shown, the thaw times between the frozen products closer to the outlet of the fan 102 (e.g., Brick #1, Brick #2) and the frozen products further from the outlet of the fan 102 (e.g., Brick #3, Brick #4) demonstrate a large deviation. The large deviation in thaw times is a result of the thermal gradient experienced by the sequence of frozen products as the airflow progressively cools.

FIG. 6 shows an example test arrangement 600 for an airflow reversal system in accordance with some embodiments of the present disclosure. The test arrangement 600 for airflow reversal includes a wind tunnel 601 having a first fan 102A and a second fan 102A disposed at opposing ends. A sequence of frozen products 603 are disposed between the fans 102A, 102B. To test the thawing performance, the fans 102A, 102B are alternately activated for predetermined intervals, thereby exposing the frozen products 603 to airflows in alternating directions. The alternating airflows may result in the frozen products 603 experiencing a more averaged and equal thermal gradient as compared to the unidirectional airflow scenario tested by the arrangement 400. The averaged thermal gradient may result in a lower deviation of product thaw times, as shown in the chart 700 of FIG. 7.

FIG. 7 shows a chart 700 of thawing performance observed in an airflow reversal system in accordance with some embodiments of the present disclosure. The chart 700 shows core temperature 701 of the frozen products 603 in the airflow reversal arrangement 600 (FIG. 6) as a function of time 703. As shown, the thaw times between the frozen products closer to the first fan 102A (e.g., Brick #1, Brick #2) and the frozen products closer to the second fan 102B (e.g., Brick #3, Brick #4) demonstrate a lower deviation as compared to the results of the non-airflow reversing arrangement 400 shown in the chart 500. The reduced deviation in thaw times of the frozen products indicates that the frozen products in the airflow reversal arrangement 600 experience a more averaged, standardized thermal gradient as compared to the frozen products of the unidirectional (e.g., non-airflow reversing) arrangement 400.

FIG. 8 shows a perspective view of an example airflow reversal system 800 in accordance with some embodiments of the present disclosure.

FIG. 9 shows an exploded view of a portion of an example airflow reversal system 800 in accordance with some embodiments of the present disclosure. In some embodiments, the airflow reversal system 800 receives vertically oriented stacks of trays, where each tray includes a plurality of frozen products for thawing. In some embodiments, the airflow reversal system 800 includes sets of rails 901A, 901B upon which trays may be disposed, thereby forming a vertical stack of trays. In some embodiments, each set of rails 901A, 901B and corresponding tray defines a shelf of the thawing chamber of the airflow reversal system 800. In some embodiments, for each shelf, the airflow reversal system includes one or more fans. In some embodiments, the fan of each shelf is attached to a shared frame such that all fans attached to the frame may be rotated simultaneously via rotation of the frame. In some embodiments, each shelf includes a pair of heating elements, which may be activated and deactivated in alternation based on the orientation of the frame and/or fan. In some embodiments, the heating elements extend vertically past the fan of each shelf.

FIG. 10 shows a perspective view of an example thawing chamber 101 of an airflow reversal system 800 in accordance with some embodiments of the present disclosure. As shown in the figures and described herein, the thawing chamber 101 may include a plurality of fans 102 attached to a frame 104 and a rotational element 103 configured to rotate the frame 104, and thereby the fans 102, between opposing orientations. In some embodiments, the thawing chamber 101 includes a first heating element 110A and a second heating element 110B. The first heating element 110A may be activated (and the seconding heating element 110B deactivated) when the frame 104 and fans 102 are positioned at a first orientation. The second heating element 110B may be activated (and the first heating element 110A deactivated) when the frame 104 and fans 102 are configured to second, opposing orientation.

FIG. 11 shows a side view of an example thawing chamber 101 of an example airflow reversal system 800 in accordance with some embodiments of the present disclosure. As shown, the rotational element 103 may include a servo motor configured to spin a drive belt. The drive belt may be operatively connected to the frame 104 such that spinning of the drive belt causes rotation of the frame 104 and, thereby, rotation of the fans 102 attached to the frame 104.

FIG. 12 shows a top view of an example thawing chamber 101 of an example airflow reversal system 800 in accordance with some embodiments of the present disclosure.

FIG. 13 shows a top view an example airflow reversal system 800 generating configured to generate flow along a first air path 106 in accordance with some embodiments of the present disclosure. FIG. 14 shows a top view the example airflow reversal system 800 configured to generate airflow along a second, opposing air path 108 in accordance with some embodiments of the present disclosure. In various embodiments, the reversing airflows along opposing air paths 106, 108 result in the frozen products 105, 107, 109, 111, 113, 115 experiencing a more standardized thermal gradient as compared to unidirectional airflow approaches. In various embodiments, the airflow reversal system 800, and other embodiments of airflow reversal systems shown in the figures and described herein), overcome technical challenges associated with reducing deviations in thaw times amongst the frozen products being thawed. In doing so, the airflow reversal system 800 may improve throughput and efficiency of thawing processes.

FIG. 15 shows a front perspective view of an example airflow reversal system 800 in accordance with some embodiment of the present disclosure. As further shown in FIG. 9, the airflow reversal system 800 may include pairs of rails 901 that receive and support a tray 1501, thereby forming a shelf within the thawing chamber of the airflow reversal system 800. In various embodiments, each tray 1501 includes a plurality of frozen products.

FIG. 16 shows a top perspective view of a portion of an example airflow reversal system 800 in accordance with some embodiments of the disclosure. As shown, a tray 1501 may be supported by a set of rails of the thawing chamber, thereby forming a shelf upon which frozen products may be placed and subjected to thawing processes. In some embodiments, for each shelf in the vertically oriented stack of shelves within the thawing chamber, the airflow reversal system 800 includes a fan 102 configured to generate airflow over a plurality of frozen products 105, 107, 109, 111, 113, 115 disposed along the shelf. In some embodiments, the fan 102 is attached to a frame 104 that is operatively connected to a rotational element 103 configured to rotate the frame 104 and, thereby, adjust the orientation of the fan 102. In some embodiments, the airflow reversal system 800 includes a first heating element 110A and a second heating element 110B that extends past each shelf in the vertically oriented stack. In various embodiments, the first and second heating elements 110A, 110B are alternately activated and deactivated based upon the orientation of the fan 102.

While various aspects have been described, additional aspects, features, and methodologies of the claimed apparatuses will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope.

Accordingly, the scope of the claimed inventions is defined by the appended claims rather than the foregoing description and the exemplary embodiments described therein.

What is claimed is:

1. A food thawing apparatus, comprising:
a thawing chamber configured to receive a plurality of frozen products;
at least one refrigeration element configured to cool air within the thawing chamber;
at least one heating element configured to heat air within the thawing chamber;
a plurality of fans spaced vertically apart from one another and in alignment with a vertical axis, wherein:
at least one fan is configured to generate an airflow of heated air within the thawing chamber, the airflow configured to thaw the plurality of frozen products;
a pivotable connection between the at least one fan and at least one rotational element; and
the at least one rotational element configured to rotate, via the pivotable connection, the at least one fan about the vertical axis between a first orientation and a second orientation to adjust the direction of the outflow of the airflow from the at least one fan to thereby adjust the direction of the airflow within the thawing chamber, wherein the at least one fan is configured to continue to generate the airflow as the at least one fan is rotated.

2. The food thawing apparatus of claim 1, further comprising:
a frame comprising the at least one heating element and the plurality of fans, wherein:
the at least one rotational element is configured to rotate the frame to adjust the direction of the airflow within the thawing chamber.

3. The food thawing apparatus of claim 2, wherein:
the at least one rotational element comprises a servomotor.

4. The food thawing apparatus of claim 3, further comprising:
a shaft extending along the vertical axis, wherein the plurality of fans are rotationally connected to the shaft; and
the at least one rotational element further comprises a drive belt configured to rotationally connect the servomotor to the shaft.

5. The food thawing apparatus of claim 1, further comprising:
a computing device configured to activate the at least one rotational element to adjust the direction of the airflow within the thawing chamber.

6. The food thawing apparatus of claim 5, wherein:
the computing device is configured to activate the at least one rotational element at a predetermined time interval.

7. The food thawing apparatus of claim 5, further comprising:
at least one thermal sensor configured to generate a thermal profile of the plurality frozen products, wherein the computing device is configured to:
receive the thermal profile from the at least one thermal sensor; and
activate the at least one rotational element based on the thermal profile.

8. The food thawing apparatus of claim 5, further comprising:
a first temperature sensor configured to measure temperature of a first portion of the thawing chamber; and
a second temperature sensor configured to measure temperature of a second portion of the thawing chamber, wherein the computing device is configured to:
receive a first temperature measurement from the first temperature sensor;
receive a second temperature measurement from the second temperature sensor;
generate a differential metric pursuant to the first portion and the second portion of the thawing chamber based at least in part on the first temperature measurement and the second temperature measurement; and
activate the at least one rotational element based at least in part on the differential metric.

9. The food thawing apparatus of claim 1, wherein:
the at least one heating element comprises a first heating element in a first portion of the thawing chamber and a second heating element in a second portion of the thawing chamber;
the first heating element is configured to be proximate to a respective outlet of the plurality of fans in the first orientation; and
the second heating element is configured to be proximate to the respective outlet of the plurality of fans in the second orientation.

10. The food thawing apparatus of claim 1, further comprising:
a plurality of shelves spaced vertically apart from one another and in alignment with a second vertical axis, wherein:
a respective shelf configured to receive a subset of the plurality of frozen products; and
the plurality of fans are vertically spaced in horizontal alignment with the plurality of shelves.

11. The food thawing apparatus of claim 10, wherein:
a first subset of the plurality of shelves comprise a solid surface configured to prevent movement of the airflow between adjacent shelves; and
a second subset of the plurality of shelves comprise a porous surface configured to enable movement of the airflow between adjacent shelves.

12. A food thawing apparatus, comprising:
a cabinet structure defining a thawing chamber having a back side, a front side, a first lateral side and a second lateral side;
at least one refrigeration element configured to cool air within the thawing apparatus;
at least one heating element configured to heat air within the thawing apparatus; and
a plurality of fans arranged to create a plurality of looped air flow paths along respective heights of the thawing chamber, wherein the apparatus is configured to operate in a first mode in which the fans are operated to move air along the looped air flow paths in a first loop direction and a second mode in which the fans are operated to move air along the looped air flow paths in a second loop direction.

13. The food thawing apparatus of claim 12, wherein:
the plurality of fans comprises at least one pair of fans comprising a first fan connected to a first motor and a second fan connected to a second motor;
the first fan and the second fan are arranged in opposite orientation relative to one another;
in the first mode, to move air along the looped air flow paths in the first loop direction, the first motor is configured to rotate the first fan in a first rotation direction and the second motor is configured to rotate the second fan in a second rotation direction that is opposite the first direction;

in the second mode, to move air along the looped air flow paths in the second loop direction, the first motor is configured to rotate the first fan in the second rotation direction and the second motor is configured to rotate the second fan in the first rotation direction; and wherein in the first mode the first fan and the second fan appear to rotate in the same direction when the fans are viewed from a side, and wherein in the second mode the first fan and the second fan appear to rotate in the same but opposite direction to the first mode.

14. A food thawing apparatus, comprising:

a cabinet structure defining a thawing chamber having a back side, a front side, a first lateral side and a second lateral side; and a plurality of fans arranged to create a plurality of looped air flow paths along respective heights of the thawing chamber, wherein the apparatus is configured to operate in a first mode in which the fans are operated to move air along the looped air flow paths in a first loop direction and a second mode in which the fans are operated to move air along the looped air flow paths in a second loop direction, wherein:

the plurality of fans comprises at least one pair of fans comprising a first fan connected to a first motor and a second fan connected to a second motor;

the first fan and the second fan are arranged in opposite orientation relative to one another;

in the first mode, to move air along the looped air flow paths in the first loop direction, the first motor is configured to rotate the first fan in a first rotation direction and the second motor is configured to rotate the second fan in a second rotation direction that is opposite the first direction;

in the second mode, to move air along the looped air flow paths in the second loop direction, the first motor is configured to rotate the first fan in the second rotation direction and the second motor is configured to rotate the second fan in the first rotation direction; and wherein in the first mode the first fan and the second fan appear to rotate in the same direction when the fans are viewed from a side, and wherein in the second mode the first fan and the second fan appear to rotate in the same but opposite direction to the first mode.

\* \* \* \* \*